Dec. 15, 1931.     H. E. SCOTT     1,836,190
TURN TABLE AND TRUCK TRAVEL LOCK
Filed Aug. 26, 1929     5 Sheets-Sheet 1
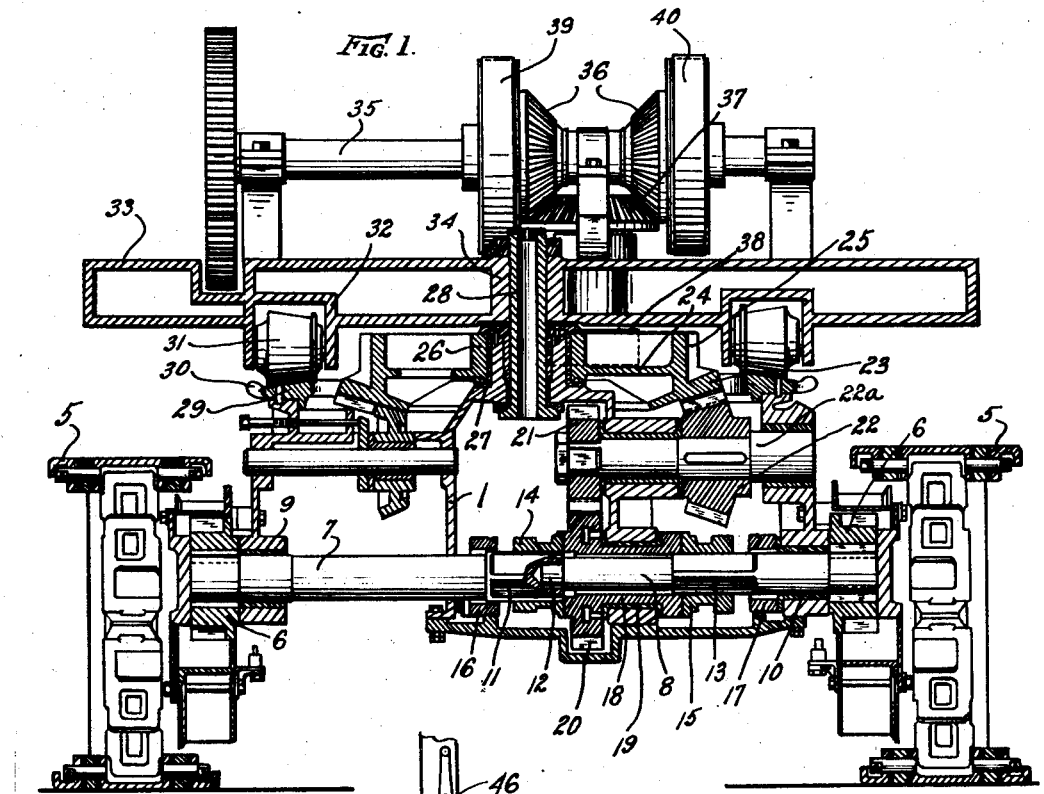
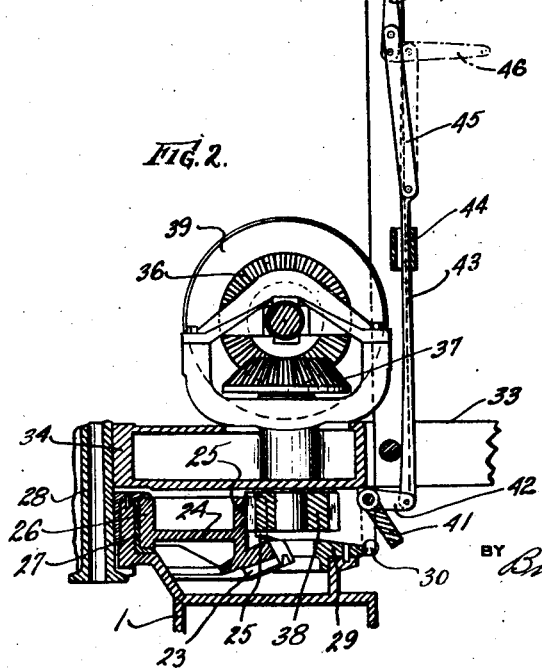
INVENTOR
Harry E. Scott
BY Brockett, Hyde, Higley & Mayer
ATTORNEYS Dec. 15, 1931.  H. E. SCOTT  1,836,190
TURN TABLE AND TRUCK TRAVEL LOCK
Filed Aug. 26, 1929   5 Sheets-Sheet 3
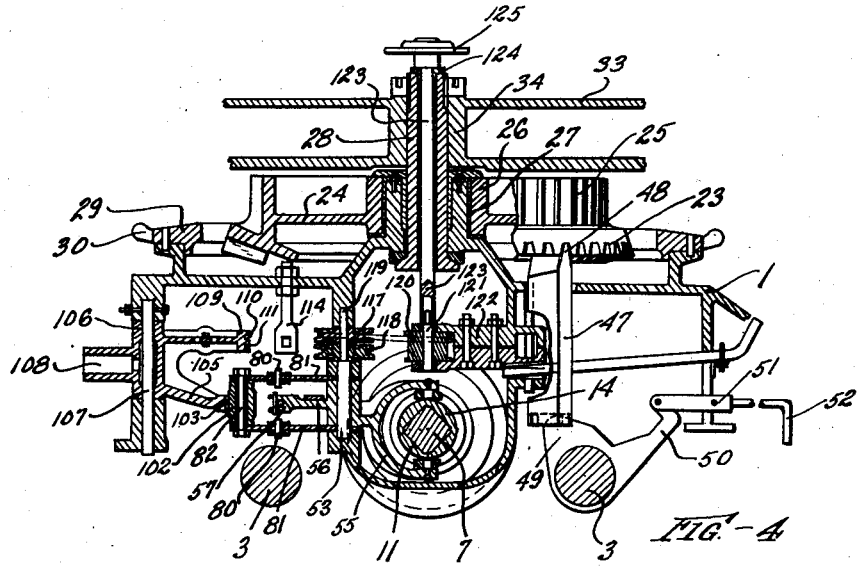
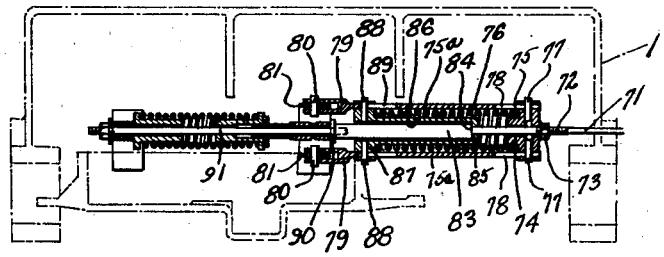
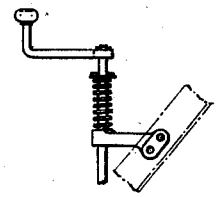
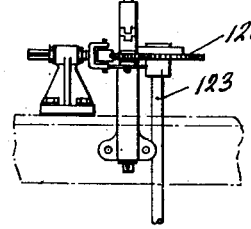
INVENTOR
*Harry E. Scott*
BY
*Brockett, Hyde, Higley & Meyer*
ATTORNEYS Dec. 15, 1931.    H. E. SCOTT    1,836,190
TURN TABLE AND TRUCK TRAVEL LOCK
Filed Aug. 26, 1929    5 Sheets-Sheet 4
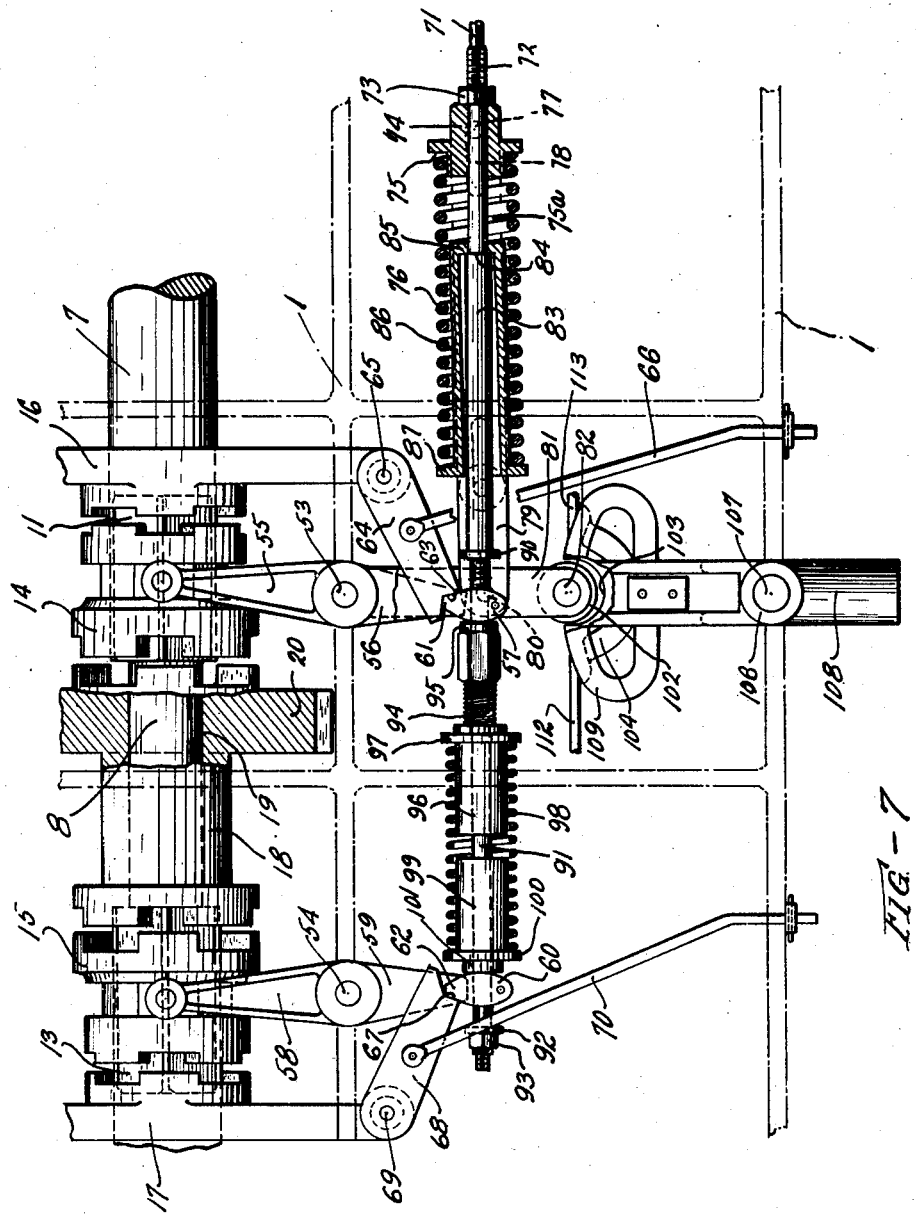
INVENTOR
*Harry E. Scott*
BY
*Brockett, Hyde, Higley & Meyer*
ATTORNEYS Patented Dec. 15, 1931

1,836,190

UNITED STATES PATENT OFFICE

HARRY E. SCOTT, OF CLEVELAND HEIGHTS, OHIO, ASSIGNOR TO THE THEW SHOVEL COMPANY, OF LORAIN, OHIO, A CORPORATION OF OHIO

TURN TABLE AND TRUCK TRAVEL LOCK

Application filed August 26, 1929. Serial No. 388,573.

The invention disclosed in this application relates to turn table and truck apparatus for use in connection with machines of the power shovel type, and has particular reference to a steering mechanism and operator operated means on the turn table.

Truck and turn table structures for use in connection with power shovels and the like heretofore have required that some connection be made between the turn table itself and the clutches in the drive to the truck treads whereby the operator may selectively, usually by a movement of the turn table, shift these clutches to lock one of the treads to the truck frame and connect the other to the drive to cause the machine to skid around as is a practice in steering.

In view of the foregoing, the object of this invention is to provide operator operated means on the turn table for operating the clutches in the power transmission to the treads according to the desire of the operator for steering purposes and thereby do away with the actuating of this clutch mechanism by movement of the turn table.

The various features of the invention are very well illustrated in the following description, drawings, and claims.

Figure 3:
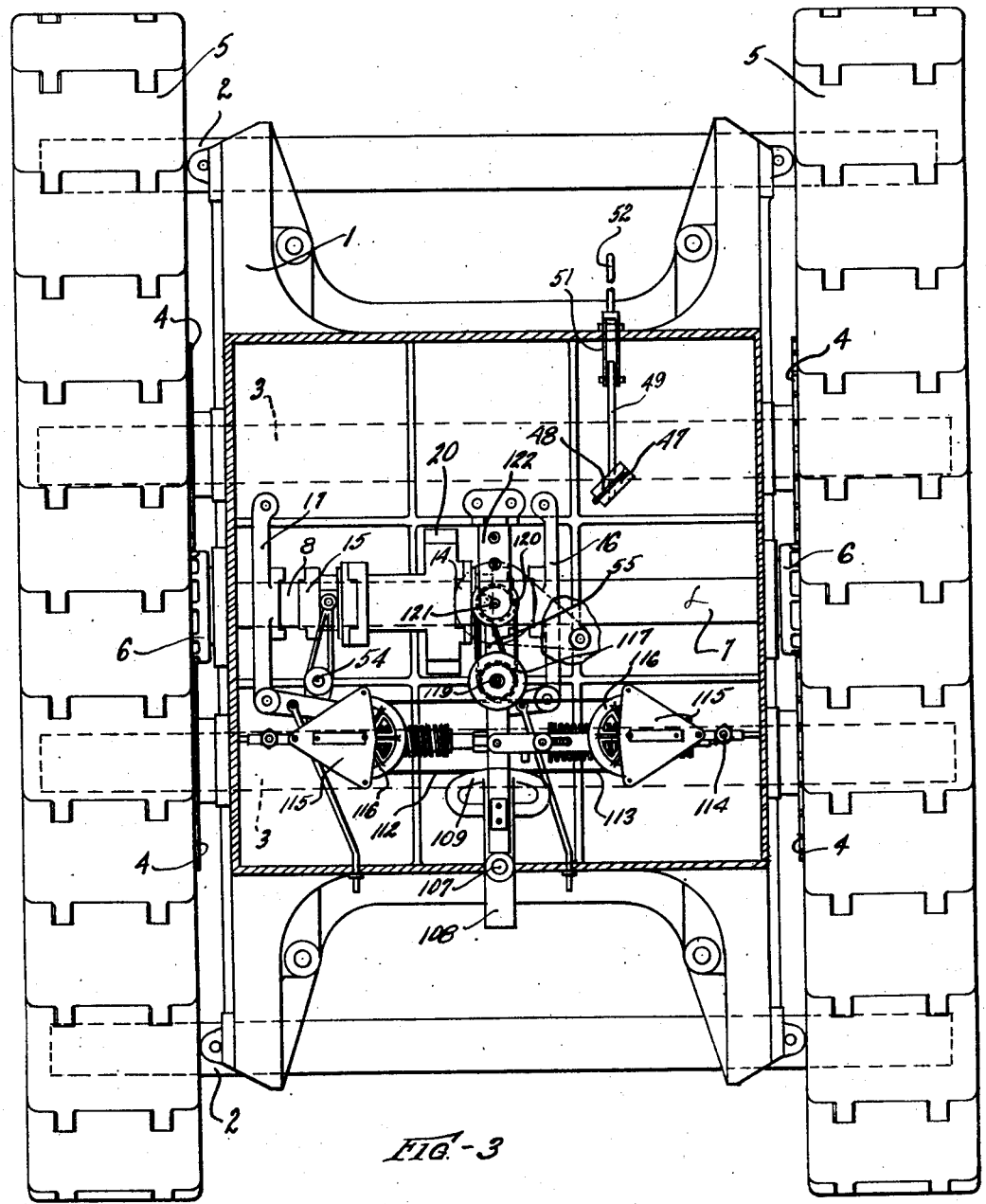
Figure 8:
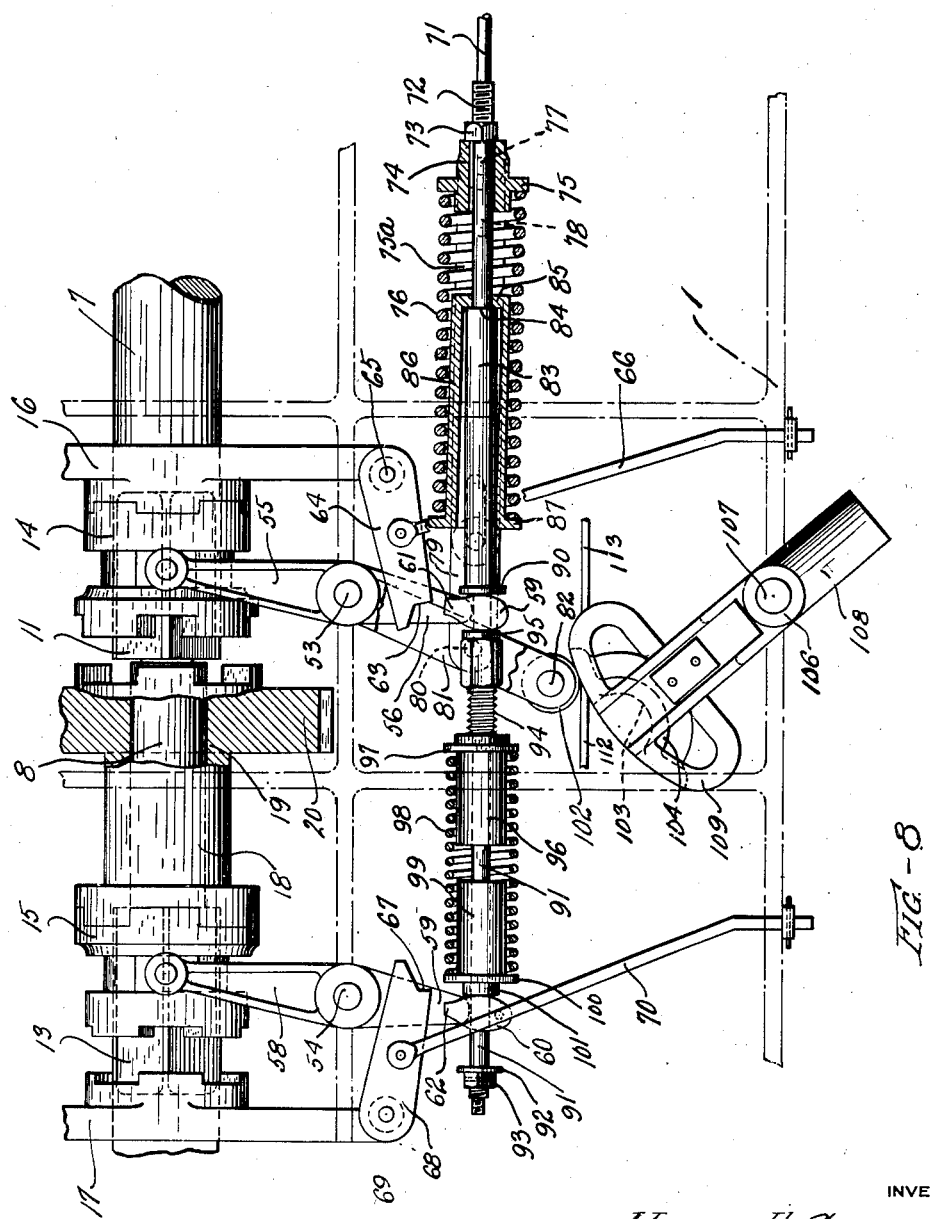

In the drawings, Fig. 1 is a view principally in transverse vertical section and particularly in elevation showing the turn table and driving mechanism; Fig. 2 is a detail view partly in section showing the means for locking the turn table to the truck; Fig. 3 is a horizontal view partly in section and partly in plan showing the truck with parts of the steering mechanism; Fig. 4 is a view partly in vertical longitudinal section and partly in elevation showing the turn table common driving element and the driving shaft with associated parts; Fig. 5 is a sectional view through the spring actuating mechanism; Fig. 6 is a detail view showing the arrangement of the turn table control or operating means; Fig. 7 is a view with the clutches in completely locked position hereby the apparatus may be towed from one place to another; Fig. 8 is a similar view showing the clutches moving in the position where the right hand tread is driven and the left hand tread is locked to the truck frame.

In the embodiment shown in the drawings, 1 represents a frame adapted to receive idler shafts or axles 2, intermediate driving roller fixed axles 3, one on each side of the transverse center of the truck and the ends of each projecting on both sides of the frame receiving the tread driving members 4 which mesh with the treads 5, one on each side of the machine. These treads pass over idlers, not shown, arranged upon the shafts 2 but of the usual type employed in this type of machinery. The two tread drivers 4 on each side of the truck frame mesh with a driving pinion 6 one on each side of the frame.

These two pinions are mounted upon a left hand shaft section 7 and a right hand shaft section 8. These two shaft sections 7 and 8 are mounted in suitable bearings 9 and 10 respectively, of any suitable construction. Shaft 7 is squared at 11 and receives a pilot 12 of the shaft section 8 which is also squared as at 13. These two squared portions 11 and 13 receive sliding clutch members 14 and 15 respectively. They are free to slide on the squared shafts and have dental teeth at both of their ends. The dental teeth at the left hand of the clutch member 14 are adapted for engagement with the left dental clutch member 16 while the other clutch member 15 has its right hand teeth arranged for engagement with a fixed dental clutch member 17. The clutch teeth at the opposite ends of these sliding clutch members 14 and 15 are adapted to be moved into engagement with corresponding clutch teeth carried upon the ends of a clutch driving member 18 arranged in a suitable bearing 19 in the frame and concentric with the axis of the two shaft sections 7 and 8. Clutch driving member 18 is provided with a driving gear 20 adapted to mesh with a driving spur pinion 21 upon a shaft 22A mounted in suitable bearings in the frame and carrying at its opposite end a bevel pinion 22. This pinion meshes with a bevel gear portion 23 forming a part of a main driving gear 24 provided with a spur gear 25. This driving member or gear 24 is provided with a hub 26 mounted on a vertical bearing 27 secured to the truck frame. Extending up through the bearing 27 is a hollow king pin 28 secured to the truck frame and concentric with the bearing 27, and outside of the bevel gear portion 23, of the gear 24, is a turn table track 29 provided upon its periphery with teeth 30 forming intervening notches for the purpose of locking the turn table to the truck frame as will appear. This track way 29 is preferably bevelled and receives bearing rollers 31, generally in a suitable circular channel 32 forming a part of the turn table 33. This turn table is provided with a central hub or bearing part 34 which receives with rotating movement the king pin 28. Mounted upon the turn table is a power shaft 35 receiving power from any suitable source and provided with bevel gears 36 facing each other and in mesh with the gear 25. The pinions 36 are loose upon the shaft 35 and may be connected thereto by any suitable clutch mechanism, indicated at 39 and 40.

It is quite obvious, from the foregoing description, that the spur gear part 25 and the bevel gear part 23 forms a common driving element between the prime mover on the turn table and the running gear or tread operating mechanism of the truck and that by locking the turn table to the truck and releasing common driving element for free rotation the power may be transmitted from the turn table to the power transmission of the truck and hence through the clutches to the treads. It is also quite evident that the common driving element may be locked to the truck and the turn table freed for rotation when a driving motion may be transmitted to the spur pinion 38 in mesh with the gear part 25 and the turn table rotated freely, and this arrangement of locks will now be described.

Mounted in the frame at any suitable point is a latch 41, Fig. 2, having an actuating arm 42 connected to a pull rod 43 slidably mounted in a suitable guide 44 and connected to the lower end of the latch 45 the upper end being connected to an operating lever 46. This mechanism, and especially the latch 41, is located upon the turn table that it may swing into any one of the notches formed by the teeth 30 on the track way 29 secured to the truck frame, thereby locking the turn table to the truck frame.

Slidably mounted in suitable guides in the frame is a bolt 47, Fig. 4, having teeth 48 at its upper end adapted for engagement between the teeth of the bevel pinion part 23 of the common driving element. This bolt 47 is moved upward by a cam 49 loosely mounted upon one of the axles 3 and is provided with an operating arm 50, in this instance manipulated by a push rod 51 having an operating handle 52 at the front of the machine. By manipulating this bolt 47 it may be left in the recess between the teeth of the bevel gear part 23 of the common driving element and locked to the frame.

It is now apparent that the operator, when he wishes to propel the apparatus along the ground, drops the latch 41 into engagement with the teeth 30 which locks the turn table to the truck. In other words, if the other lock 47 be lowered or released, then power may be transmitted from the turn table through to the transmission mechanism for the treads. On the other hand, if he wishes to hold the truck in position and swing his table he releases the latch 41 and throws into operative position the lock 47 and the common driving element will be held and the turn table will be freely rotated.

The steering mechanism for the most part is mounted to the rear, so to speak, of the shaft sections 7 and 8 as is shown in Fig. 3 and its details will be found more particularly in Figs. 4, 5, 7 and 8. Mounted in the frame, in any suitable manner, are yoke pins 53 and 54 the former serving as a pivot for a clutch lever including a yoke portion 55 engaging, in a suitable groove, a clutch member 14 and an actuating arm 56 also provided with a smaller yoke 57 for engagement with controlling and actuating means as will appear. The pin 54 pivotally supports a right hand clutch lever having a yoke part 58 and an actuating part 59, the latter being provided with a yoke 60 engaging the control, while the yoke portion 58 engages the grooves and the right hand clutch member 15. The yokes 57 and 60 are provided with a tail portion 61 and 62 respectively. The tail portion 61 adapted for engagement by a shoulder 63 carried by a locking lever 64 secured at 65 to the frame and adapted to be manipulated by a pull rod 66, and in like manner, the tail portion 62 is adapted to be engaging between shoulder 67 of locking lever 68 pivoted at 69 to the frame and actuated by a pull rod 70. When both of these clutch levers have their clutches in mid unclutched position as shown in Fig. 7 they may be latched in this manner by the lock levers 64 and 68. At this time the apparatus may be towed along the ground without the drag of any driving mechanism being coupled to the moving parts.

The yoke ends 57 and 60 of the clutch levers are operated and controlled by a yielding mechanism comprising a rod 71 sliding in the frame, as shown in Fig. 5, and having a threaded portion 72 receiving a thrust nut 73 adapted to be engaged by a cross head 74. This cross head has a suitable spring seat 75 for receiving a spring 76 and opposed pins 77 adapted to receive pull bars 75A, two in number, upper and lower. These pins 77 pass through slots 78 in these bars as shown in Fig. 5. These bars are provided at their left ends, as shown in Fig. 5, with clevices 79 receiving pins 80 passing through levers 81 pivoted upon the pin 53 of the left hand clutch member. These levers are above and below the actuating arm 56 of the left hand clutch lever as shown clearly in Fig. 4. These levers 81 project beyond the pins 80 and are connected to an actuating pin 82. This pin 82 is engaged by shifting a device which will be described.

The rod 71 passes within the spring 76 and is enlarged as at 83 from a shoulder 84 adapted to be engaged by the end 85 of the plunger sleeve 86 which is also provided with a spring seat 87 for the spring 76. This spring seat is provided with oppositely extending pins 88 also passing through slots 89 in the bars 75. It will be seen from the foregoing description, referring now to Fig. 5, that a pull to the left upon the bars 75 will cause the spring 76 to be compressed against the seat 87 of the plunger sleeve, the cross head 74 sliding freely upon the rod 72 and leaving the thrust nut 73. This operation produces a yielding pressure upon the shaft 71 and the enlarged portion 83 and incidently upon a collar 90 held against the end of the enlarged portion 83 and loosely surrounding an extension rod 91 threaded into the enlarged portion 83.

The collar 90 is held against the enlarged portion 83 by engagement in this collar with the end yoke 57 of the lever which throws the clutch 14 so that ultimately sufficient movement of the levers 81 and the cross head will cause a movement of the lever and the shifting of the clutch 14. In the arrangement shown in Fig. 8 this action has taken place and the clutch 14 is in engagement with the fixed jaw 16. The extension rod 91 extends out to the left as shown in Figs. 5, 7 and 8, where its threaded end is provided with a clutch collar 92 held in place against the shoulder end of the rod 91 by a lock nut 93. Loosely mounted upon this rod 91 and adjacent the fork 57 as shown in Fig. 8, for example, is a threaded yoke engaging sleeve 94 having an end portion 95 for engagement with the other side of the yoke 57 and having its threaded portion engaging in a spring seat sleeve 96 providing a spring seat 97 for a spring 98 which surrounds the sleeve 96 and also surrounds another spring sleeve 99 loose upon this same rod 91 provided with another spring seat 100. Receiving the thrust of the spring 98 this spring sleeve 99 has an abutment or collar 101 for engagement with the other fork 60 of the other clutch lever for the clutch 15. The normal tendency of the spring 98 is to spread the two collars 95 and 101 and cause the two clutch levers to move the two clutches 14 and 15 into engagement with the driving member 18 and in the arrangement shown in Fig. 8 where the levers 81 have been thrown to the right and clutch member 14 has been thrown to the left in locked position. The spring 98 tends to maintain the other clutch member 15 in driving relation whereby the right hand tread would be driven and the left hand tread would be locked. Upon the return of the levers 81 to neutral or central position the right hand thrust just described which brought the clutch 14 into position shown in Fig. 8 is relieved and spring 98 tends to hold the two clutches in driving position, and therefore in engagement with the driving member 18. When the left hand tread is to be driven and the right hand tread is to be locked the levers 81 are swept to the left as shown in Fig. 8 when the bars 75 are moved to the right in Fig. 5, and the left in Fig. 8 which will cause the pins 88 to be engaged by the bars at the ends of the slots 89 and the plunger sleeve 86 will be moved toward the cross head 74 which is at that time in engagement with the nut 73. This will cause the yielding tension of the spring 76 to be brought to bear upon the entire rod structure including the parts 71, 83, 91, and this rod will be shifted to the right in Fig. 5 and to the left in Fig. 8 when the abutment or collar 92 will engage the right hand side of the yoke 60, Fig. 8, thereby shifting the clutch 15, which heretofore has been in engagement with the driving member to the right and into engagement with the fixed clutch member 17, thereby locking the right hand tread. No change, however, has taken place in the left hand clutch member because of the fact that the spring 98 is still tending to move this clutch member 14 into engagement with the driving member.

From the foregoing it is obvious that the levers 81 are used to move the clutch members into driving or locked position. It is also obvious that varied movement of the levers 81 could produce a release of one clutch member from engagement with the driving member and yet not move it into engagement with the fixed clutch member, in which case, its tread would not be locked but would not be driven, therefore, the driven tread would have an opportunity to manipulate the truck and this operation is useful in making turns of greater radius than is possible where one tread is locked.

The foregoing description relates substantially to a construction which has heretofore been employed and it is only described in this case to give a clear understanding of this application which relates particularly to hand operation of the steering mechanism.

The steering mechanism includes a roller

102, Fig. 4, mounted on actuating pin 82 between the levers 81 and is adapted to normally engage, when in central position, a notch 103 in a segment 104 carried by an operating arm 105 mounted upon a hub 106, rotatably mounted upon a pin 107, secured in the frame. This hub 106, as usual in former practice, is provided with a pole socket 108 for manipulating lever 105. It is also provided for the sheaves segment 109 having grooves 110 and 111 for cable ends 112 and 113, Fig. 3. These two cable ends come from opposite directions and enter their grooves and are dead ended upon the back of this member in any suitable manner not shown. Mounted in the frame, as on brackets 114, Fig. 4, and arranged one at each side of the frame and symmetrically disposed on either side of the sheave segment 109, are snatch box structures generally indicated at 115, and are arranged in horizontal position and usually carrying a sheave 116. These sheaves receive the two rope ends 112 and 113 which pass around idlers 117 and 118 one above the other upon a pin 119 and thence to the center where they are wound in opposite directions upon a drum 120 Figs. 3 and 4. This drum is mounted on a shaft 121 suitably supported in a bracket 122 secured to the frame the shaft 121 being directly below the opening in the hollow king pin 28. The shaft 121 is secured in the lower end of a vertical shaft 123 extending up through the king pin 28 and provided at its upper end with a bearing 124 in the upper end of the king pin. The extreme upper end of this shaft is provided with a sprocket wheel 125 which, of course, is at the center of rotation of the turn head.

Having described my invention, I claim:

1. In turntable and truck steering apparatus of the class described, a turntable, a truck frame connected therewith, power means upon the turntable, supporting and propelling means carried by the truck frame, power transmission mechanism between the power means on the turntable and the propelling and supporting means, clutch mechanism in said transmission for coupling and uncoupling the same with said propelling and supporting means for use in steering, an actuator on the truck for operating said clutch mechanism an actuator mounted on the turntable, and operative connections between the two actuators effective in spite of turntable rotation and comprising a sheave segment carried by the truck actuator, a drum operatively connected to the turntable actuator, and a flexible rope-like member wound upon the drum and connected to said segment for actuating said clutch mechanism in its several directions.

2. In turntable and truck steering apparatus of the class described in claim 1, wherein the rope-like member forms a loop, and yielding idle sheave members mounted on the truck for maintaining the loop.

3. In turntable and truck steering apparatus of the class described in claim 1, wherein the rope-like member forms a loop, and a pair of spaced sheave members yieldingly mounted on the truck and arranged in a line normal to a line between the drum and the sheave segment.

4. In turntable and truck steering apparatus of the class described in claim 1, wherein the connection between the actuator on the turntable and the clutch actuator on the truck comprises a shaft extending through the pivotal axis of the turntable on the truck.

5. In turntable and truck steering apparatus of the class described in claim 1, wherein the connection between the actuator on the turntable and the clutch actuator on the truck comprises a shaft extending through the pivotal axis of the turntable on the truck, and the actuator on the turntable is out of alignment with the axis of rotation of the turntable and is geared to the shaft by suitable gearing.

In testimony whereof I hereby affix my signature.

HARRY E. SCOTT.